United States Patent
Smith (10) Patent No.: US 9,742,801 B1
(45) Date of Patent: Aug. 22, 2017

(54) SYSTEMS AND METHODS FOR PREVENTING THE EXECUTION OF ONLINE MALVERTISING

(71) Applicant: Symantec Corporation, Mountain View, CA (US)

(72) Inventor: Spencer Smith, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/864,931

(22) Filed: Sep. 25, 2015

(51) Int. Cl.
*G06F 11/00* (2006.01)
*H04L 29/06* (2006.01)
*H04L 29/08* (2006.01)
*G06F 17/30* (2006.01)

(52) U.S. Cl.
CPC .... *H04L 63/1466* (2013.01); *G06F 17/30548* (2013.01); *H04L 67/02* (2013.01)

(58) Field of Classification Search
CPC .................................................. H04L 63/1466
USPC .......................................................... 726/23
See application file for complete search history.

(56) References Cited

U.S. PATENT DOCUMENTS

| | | | |
|---|---|---|---|
| 2013/0160120 A1* | 6/2013 | Malaviya | G06F 21/53 726/23 |
| 2013/0191919 A1* | 7/2013 | Basavapatna | G06F 21/577 726/25 |
| 2016/0182537 A1* | 6/2016 | Tatourian | H04L 63/1441 726/23 |

OTHER PUBLICATIONS

Everett Lai; Systems and Methods for Preventing Online Advertising Fraud; U.S. Appl. No. 14/871,755, filed Sep. 30, 2015.
"AdWatcher", http://www.adwatcher.com/faq.php, as accessed Sep. 1, 2015, (Mar. 22, 2007).
"KeywordMax", http://directresponse.com/2009_DRT_Website/keywordmax-product-overview.html, as accessed Sep. 1, 2015, (Jan. 3, 2010).
"Click Sentinel", http://www.adwordsadsensetools.com/Click-Sentinel.html, as accessed Sep. 1, 2015, (Mar. 19, 2007).
"ClickTracks", http://www.clicktracks.com/products/pro/index.php, as accessed Sep. 1, 2015, (Feb. 3, 2005).
"Forensiq", https://forensiq.com/, as accessed Sep. 1, 2015, (Feb. 12, 2012).
"SimilarWeb", http://www.similarweb.com/, as accessed Sep. 1, 2015, (Apr. 28, 2001).
"spider.io", http://www.spider.io/blog/, as accessed Sep. 1, 2015, (Oct. 28, 2011).
"Telemetry", http://www.telemetry.com/, as accessed Sep. 1, 2015, (Oct. 19, 2000).

(Continued)

*Primary Examiner* — Christopher Brown
(74) *Attorney, Agent, or Firm* — FisherBroyles LLP (57) ABSTRACT

A computer-implemented method for preventing the execution of online malvertising may include (1) maintaining a database of software version information for at least one client device, (2) detecting a request from the client device to access a website that contains active advertising content, (3) identifying, by querying the database of software version information, a vulnerability in at least one software element on the client device that may be used to deliver the active advertising content, and (4) preventing delivery of the active advertising content to the client device. Various other methods, systems, and computer-readable media are also disclosed.

20 Claims, 7 Drawing Sheets

(56) References Cited

OTHER PUBLICATIONS

"White Ops", http://www.whiteops.com/, as accessed Sep. 1, 2015, (May 20, 2013).
"Click Auditor", http://www.keywordmax.com/click_auditor.html, as accessed Sep. 1, 2015, (Oct. 4, 2003).
"Click Sentinel", http://www.clicksentinel.com/, as accessed Sep. 2, 2015, (Apr. 4, 2005).
Scott, Samuel, "The Alleged $7.5 Billion Fraud in Online Advertising", https://moz.com/blog/online-advertising-fraud, as accessed Sep. 1, 2015, Moz, (Jun. 22, 2015).

* cited by examiner

SYSTEMS AND METHODS FOR PREVENTING THE EXECUTION OF ONLINE MALVERTISING

BACKGROUND

Online advertising often depends on cooperation between advertisers who create advertisements and providers who display the advertisements to end users. However, providers of online advertising typically have very low security requirements or control over the content created by advertisers. Due to lax controls, advertisements may contain various types of malware that are not detected by providers. Whether intentional or not, these forms of malicious advertising, or "malvertising," can be harmful to end users.

In some cases, malvertising can cause malware to infect computing devices after a user performs an action, such as clicking on an advertisement. In other cases, user interaction may not be necessary for malware to infect computing devices. For example, malware may install itself on a computing device simply through the display of an advertisement on vulnerable browsers or through other vulnerable software. Traditionally, security measures have attempted to detect such malware after an advertisement displays on the computing device or to remove the malware after it has infected the computing device. However, in the cases where malvertising does not require user interaction, traditional security measures may not be able to detect malware or to prevent infection of the device. Accordingly, the instant disclosure identifies and addresses a need for additional and improved systems and methods for preventing the execution of online malvertising.

SUMMARY

As will be described in greater detail below, the instant disclosure describes various systems and methods for preventing the execution of online malvertising by detecting vulnerable software on a computing device and preventing advertisements from exploiting the vulnerability. Additionally, the disclosed system may replace advertisements that run on vulnerable software with different advertisements during an advertising transaction, such as a real-time bidding process. Furthermore, when a non-vulnerable version of the software is available, this system may prompt for an update to the vulnerable software to reduce future risk of malvertising.

In one example, a computer-implemented method for preventing the execution of online malvertising may include (1) maintaining a database of software version information for at least one client device, (2) detecting a request from the client device to access a website that contains active advertising content, (3) identifying, by querying the database of software version information, a vulnerability in at least one software element on the client device that may be used to deliver the active advertising content, and (4) preventing delivery of the active advertising content to the client device.

In one embodiment, the software version information may include a software version identifier. Additionally or alternatively, the software version information may include a user-selected optional feature. Furthermore, in some examples, maintaining the database of software version information may include collecting the software version information from the client device and updating the software version information for the client device. In these examples, updating the software version information for the client device may include automatically collecting new software version information on a preset schedule and/or collecting the new software version information based on receiving a notice of change from the client device. In further examples, identifying the vulnerability in the software element on the client device may include matching the software version information for the client device with a predetermined list of vulnerable software versions.

In some embodiments, preventing the delivery of the active advertising content to the client device may include replacing an advertisement running the active advertising content with a different advertisement. In these embodiments, the different advertisement may include an advertisement with non-active content and/or an advertisement with different active advertising content that does not use the vulnerable software element. Additionally or alternatively, in other embodiments, preventing the delivery of the active advertising content may include blocking the advertisement running the active advertising content.

In one example, the computer-implemented method may further include determining that a non-vulnerable version of the vulnerable software element exists. In this example, the computer-implemented method may additionally include prompting a user of the client device to update the vulnerable software element to the non-vulnerable version of the software element.

In one embodiment, a system for implementing the above-described method may include (1) a maintenance module, stored in memory, that maintains a database of software version information for at least one client device, (2) a detection module, stored in memory, that detects a request from the client device to access a website that contains active advertising content, (3) an identification module, stored in memory, that identifies, by querying the database of software version information, a vulnerability in at least one software element on the client device that may be used to deliver the active advertising content, and (4) a prevention module, stored in memory, that prevents delivery of the active advertising content to the client device. In addition, the system may include at least one processor that executes the maintenance module, the detection module, the identification module, and the prevention module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain a database of software version information for at least one client device, (2) detect a request from the client device to access a website that contains active advertising content, (3) identify, by querying the database of software version information, a vulnerability in at least one software element on the client device that may be used to deliver the active advertising content, and (4) prevent delivery of the active advertising content to the client device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing the execution of online malvertising. As will be explained in greater detail below, by maintaining a record of vulnerable software on client devices, the systems and methods disclosed herein may detect potential risks of malvertising. For example, by collecting software version information, the disclosed systems and methods may identify vulnerabilities that malvertising can exploit. The disclosed systems and methods may then replace advertising that may exploit the detected vulnerabilities with advertising that may not.

Figure 1:
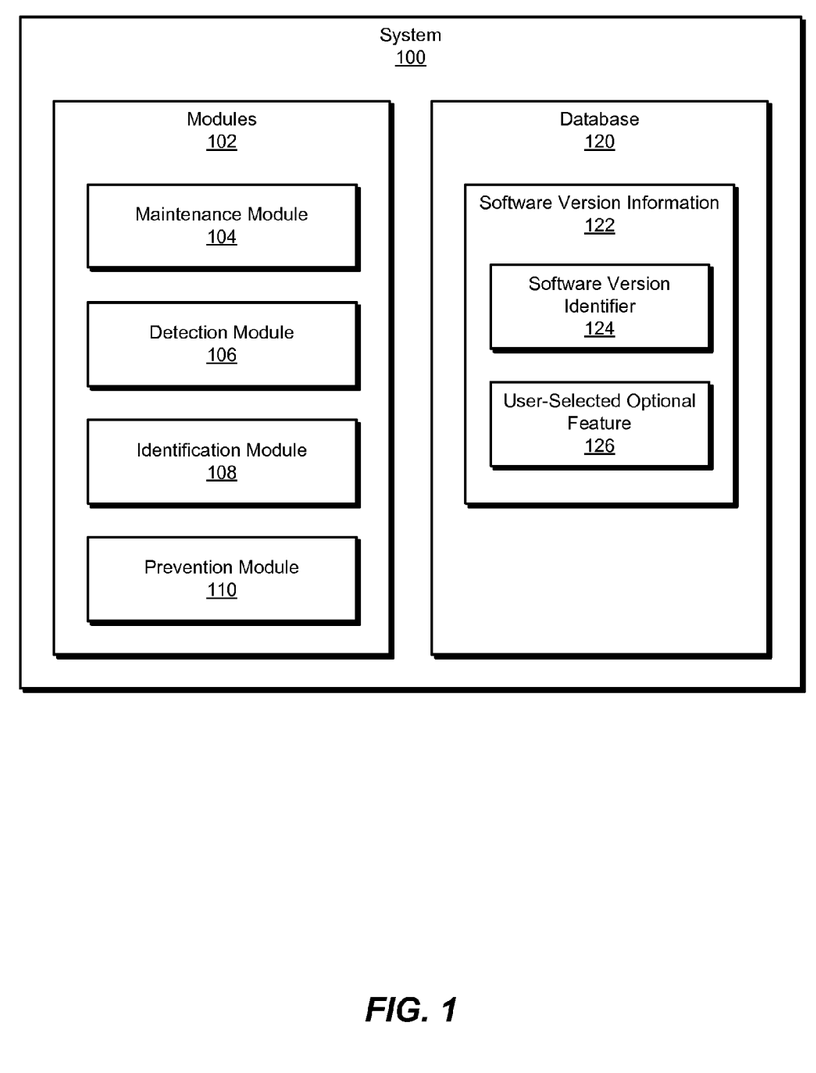
FIG. 1 is a block diagram of an exemplary system for preventing the execution of online malvertising.
Figure 2:
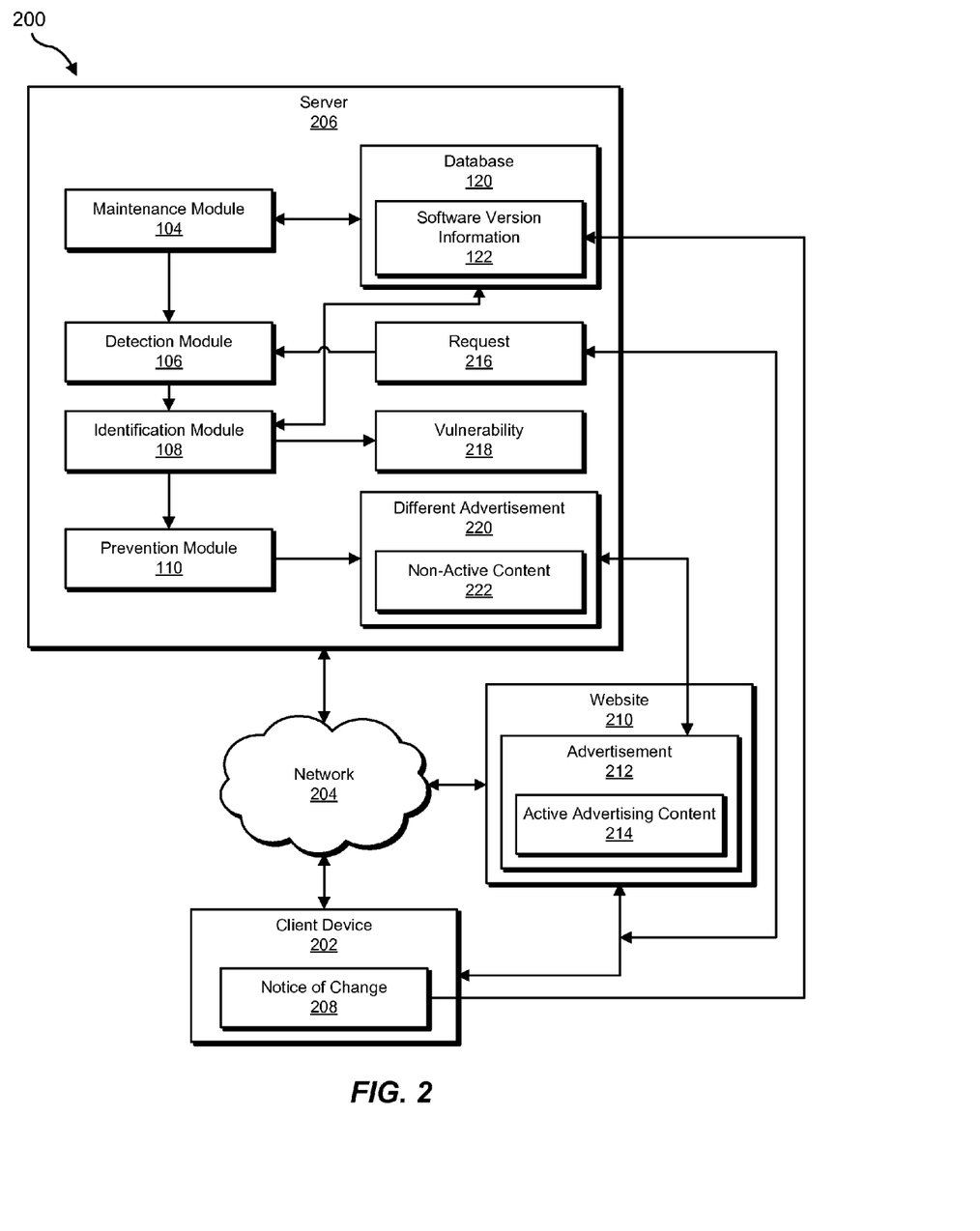
FIG. 2 is a block diagram of an additional exemplary system for preventing the execution of online malvertising.

The following will provide, with reference to FIGS. 1 and 2, detailed descriptions of exemplary systems for preventing the execution of online malvertising. Detailed descriptions of corresponding computer-implemented methods will also be provided in connection with FIG. 3. In addition, detailed descriptions of an exemplary detection of a software vulnerability based on an exemplary predetermined list of vulnerable software versions will be provided in connection with FIG. 4. Furthermore, detailed descriptions of an exemplary prompt to a user to update a vulnerable software element to a non-vulnerable version of the software element will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for preventing the execution of online malvertising. The term "malvertising," as used herein, generally refers to malicious advertising that may infect computing devices with malware. Although some forms of malvertising may contain interactive content, other forms of malvertising may be dynamic and automatically install malware on a computing device.

As illustrated in FIG. 1, exemplary system 100 may include one or more modules 102 for performing one or more tasks. For example, and as will be explained in greater detail below, exemplary system 100 may also include a maintenance module 104 that may maintain a database of software version information for at least one client device. Exemplary system 100 may additionally include a detection module 106 that may detect a request from the client device to access a website that contains active advertising content. The term "active advertising content," as used herein, generally refers to interactive or dynamic web content used to deliver an advertisement. Examples of active advertising content may include, without limitation, streaming video, streaming audio, content running on browser plug-ins (e.g., JAVA, FLASH, QUICKTIME, etc.), embedded objects, or any other form of active content that may run an advertisement.

Exemplary system 100 may also include an identification module 108 that may identify, by querying the database of software version information, a vulnerability in at least one software element on the client device that may be used to deliver the active advertising content. The term "vulnerability," as used herein, generally refers to a risk or weakness in a software element that can be exploited by an attacker. Notably, a software vulnerability may be exploited when attackers can access the vulnerability through an online channel, such as online advertisements.

Finally, exemplary system 100 may include a prevention module 110 that may prevent delivery of the active advertising content to the client device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store software version information 122, which may include information about one or more software elements running on one or more computing devices.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client device 202 in communication with a server 206 via a network 204. In one example, client device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and client device 202 may be merged into a single machine or computing system.

In one embodiment, one or more of modules 102 from FIG. 1 may, when executed by at least one processor of client device 202 and/or server 206, enable client device 202 and/or server 206 to prevent online malvertising from exploiting software vulnerabilities. For example, and as will be described in greater detail below, maintenance module 104 may maintain database 120 of software version information 122 for client device 202. Detection module 106 may detect a request 216 from client device 202 to access a website 210 that contains active advertising content 214. Identification module 108 may then identify, by querying database 120 of software version information 122, a vulnerability 218 in at least one software element on client device 202 that may be used to deliver active advertising content 214. Finally, prevention module 110 may prevent delivery of active advertising content 214 to client device 202.

In the example of FIG. 2, and as will be explained in greater detail below, server 206 may receive, via network 204, a notice of change 208 from client device 202 and may update software version information 122 in database 120 based on notice of change 208. Server 206 may then detect request 216 indicating client device 202 is attempting to access website 210, which may contain an advertisement 212 with active advertising content 214. Next, server 206 may query database 120 to obtain software version information 122 for client device 202. Server 206 may then identify vulnerability 218 in a software element on client device 202 and may subsequently prevent active advertising content 214 from running on client device 202. In addition to preventing active advertising content 214 from running, server 206 may also replace advertisement 212 with a different advertisement 220 that contains non-active content 222.

Client device 202 generally represents any type or form of computing device capable of reading computer-executable instructions. Examples of client device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of detecting and storing software version information and/or preventing the delivery of active advertising content. Examples of server 206 include, without limitation, application servers and database servers configured to provide various database services and/or run certain software applications, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between client device 202 and server 206.

Figure 3:
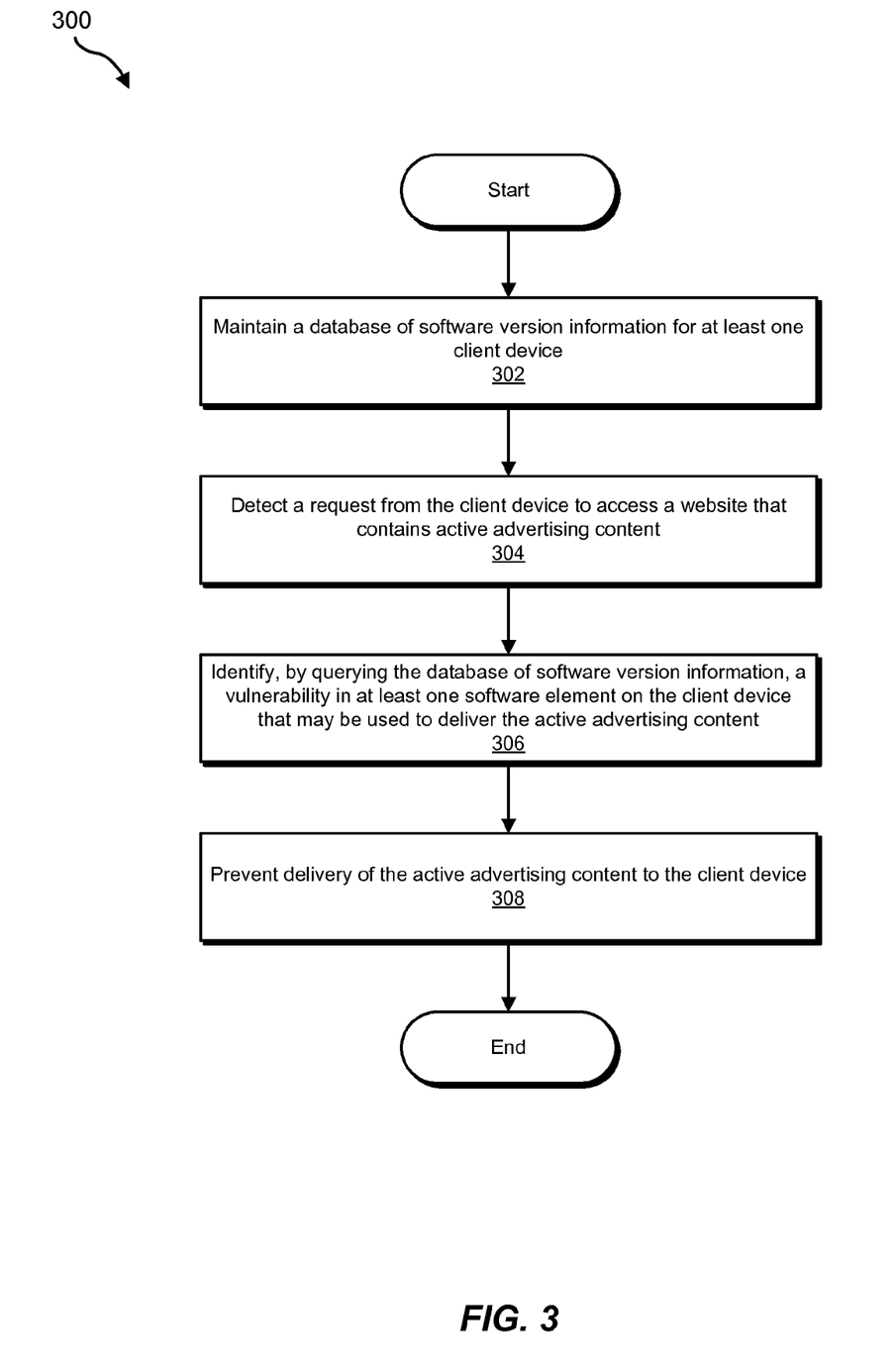
FIG. 3 is a flow diagram of an exemplary method for preventing the execution of online malvertising.

FIG. 3 is a flow diagram of an exemplary computer-implemented method 300 for preventing the execution of online malvertising. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may maintain a database of software version information for at least one client device. For example, maintenance module 104 may, as part of server 206 in FIG. 2, maintain database 120 of software version information 122 for client device 202.

In one embodiment, software version information 122 may include a software version identifier, such as a software version number. Additionally or alternatively, software version information 122 may include a user-selected optional software feature. As in the example of FIG. 1, software version information 122 may include a software version identifier 124 as well as a user-selected optional feature 126.

Maintenance module 104 may maintain database 120 in a variety of ways. In some examples, maintenance module 104 may maintain database 120 by collecting software version information 122 from client device 202. For example, maintenance module 104 may send a JAVASCRIPT request to client device 202 in order to retrieve information about browsers and plug-ins used by client device 202. Furthermore, maintenance module 104 may update software version information 122 for client device 202 in database 120. In these examples, updating software version information 122 may include automatically collecting new software version information on a preset schedule. Additionally or alternatively, as in the example of FIG. 2, updating software version information 122 may include collecting the new software version information based on receiving notice of change 208 from client device 202. In this example, notice of change 208 may include information on a specific software element that has changed or a general software change to client device 202.

Returning to FIG. 3, at step 304, one or more of the systems described herein may detect a request from the client device to access a website that contains active advertising content. For example, detection module 106 may, as part of server 206 in FIG. 2, detect request 216 from client device 202 to access website 210 that contains active advertising content 214.

Detection module 106 may detect request 216 in a variety of ways. For example, detection module 106 may monitor web traffic and detect devices accessing website 210. In another example, detection module 106 may monitor an advertisement provider, such as an ad server, and detect when advertisement 212 is requested by website 210. Additionally or alternatively, detection module 106 may monitor client device 202 and detect attempts to access any website.

Returning to FIG. 3, at step 306, one or more of the systems described herein may identify, by querying the database of software version information, a vulnerability in at least one software element on the client device that may be used to deliver the active advertising content. For example, identification module 108 may, as part of server 206 in FIG. 2, identify, by querying database 120 of software version information 122, vulnerability 218 in a software element on client device 202 that may be used to deliver active advertising content 214.

Identification module 108 may identify vulnerability 218 in a variety of ways. In some embodiments, identification module 108 may identify vulnerability 218 by matching software version information 122 for client device 202 with a predetermined list of vulnerable software versions. The predetermined list of vulnerable software versions may be decided by industry standards, compiled from aggregate data across multiple client devices, and/or determined based on a past software history of client device 202.

Figure 4:
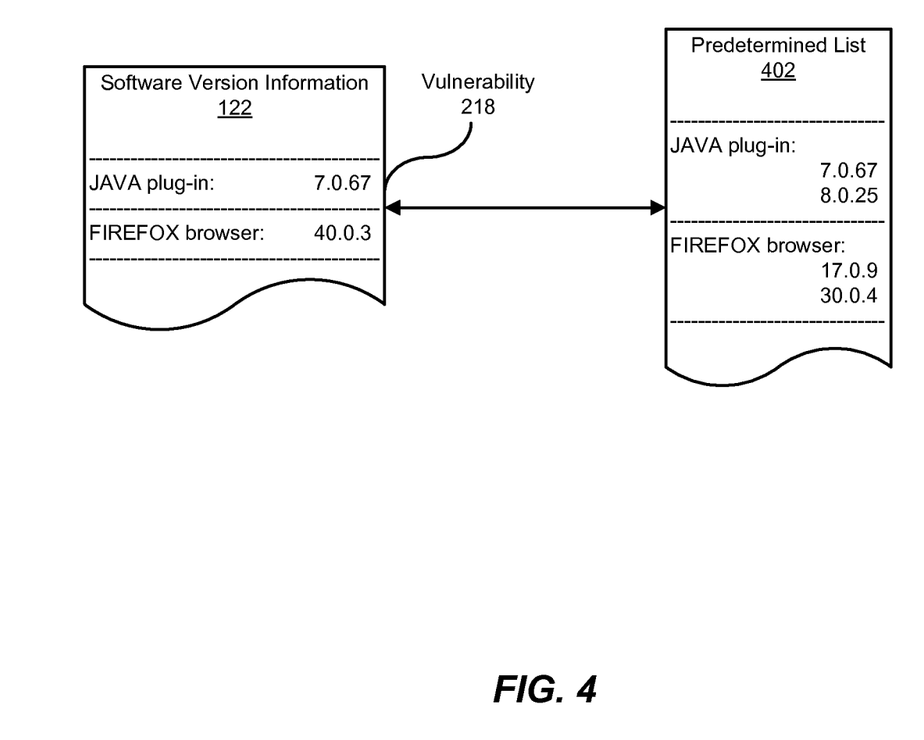
FIG. 4 is an illustration of an exemplary detection of a software vulnerability based on an exemplary predetermined list of vulnerable software versions.

For example, as shown in FIG. 4, software version information 122 may be compared with a predetermined list 402. In this example, software version information 122 may contain version information about a browser plug-in (e.g., "JAVA plug-in: 7.0.67") and a browser (e.g., "FIREFOX browser: 40.0.3"). Additionally, in this example, predetermined list 402 may contain information about vulnerable versions of the plug-in (e.g., 7.0.67 and 8.0.25) and the browser (e.g., 17.0.9 and 30.0.4). Identification module 108 may then identify vulnerability 218 by determining that the version of the plug-in used by client device 202 is listed in predetermined list 402.

Returning to FIG. 3, at step 308, one or more of the systems described herein may prevent delivery of the active advertising content to the client device. For example, prevention module 110 may, as part of server 206 in FIG. 2, prevent delivery of active advertising content 214 to client device 202.

Prevention module 110 may prevent delivery of active advertising content 214 in a variety of ways. In one embodiment, prevention module 110 may block advertisement 212, which runs active advertising content 214. In this embodiment, prevention module 110 may block advertisement 212 by using sandbox methods to prevent specific web traffic. Prevention module 110 may prevent transfer of active advertising content 214 from an advertisement provider to website 210 and/or from website 210 to client device 202.

In another embodiment, prevention module 110 may replace advertisement 212 running active advertising content 214 with different advertisement 220. In this embodiment, different advertisement 220 may include non-active content 222 as shown in the example of FIG. 2. Additionally or alternatively, different advertisement 220 may include different active advertising content that does not use the vulnerable software element. Furthermore, in this embodiment, prevention module 110 may replace advertisement 212 as part of a real-time bidding process, during which advertisers may bid on advertising space on website 210 that is vacated by advertisement 212.

In some embodiments, one or more of the systems described herein may determine that a non-vulnerable version of the vulnerable software element exists. The term "non-vulnerable version," as used herein, generally refers to a version of a software element that is not known to have any vulnerabilities. For example, server 206 may determine that a version of the vulnerable software element is available for download from a software developer's website. Server 206 may then determine that the version available for download is not included on predetermined list 402 and may subsequently label it "non-vulnerable."

Figure 5:
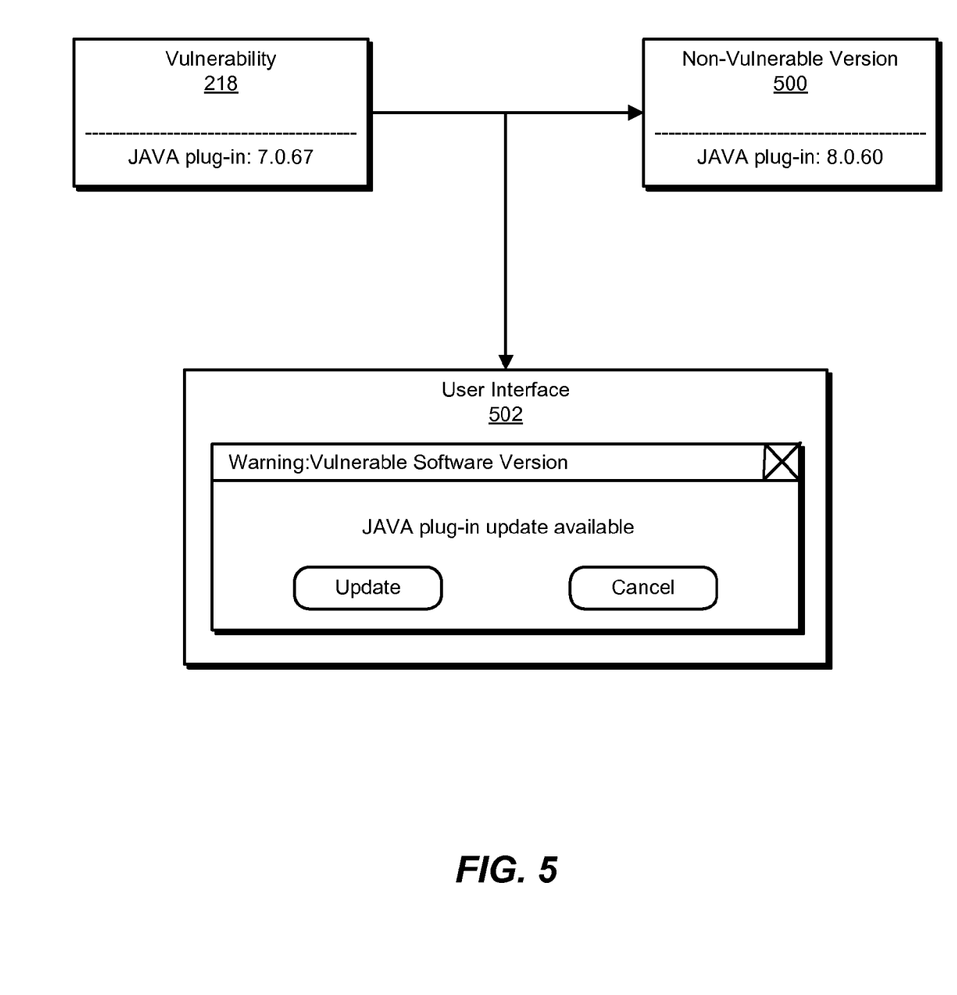
FIG. 5 is an illustration of an exemplary prompt to a user to update a vulnerable software element to a non-vulnerable version of the software element.

Furthermore, in these embodiments, one or more of the systems described herein may prompt a user of client device 202 to update the vulnerable software element to the non-vulnerable version of the software element. For example, as shown in FIG. 5, a non-vulnerable version 500 (e.g., "JAVA plug-in: 8.0.60") may exist for the software element with vulnerability 218 (e.g., "JAVA plug-in: 7.0.67"). As illustrated by a user interface 502, the user of client device 202 may then choose to update the vulnerable browser plug-in to non-vulnerable version 500.

As explained above in connection with method 300 in FIG. 3, the disclosed systems and methods may, by detecting software vulnerabilities, prevent potential malvertising from infecting a computing device with malware. Specifically, the disclosed systems and methods may first collect information about versions of software running on the computing device. The disclosed systems and methods may also update existing information about versions of software running on the computing device. For example, the systems and methods described herein may receive a notification from the computing device that a software version has changed. In another example, the systems and methods described herein may request up-to-date software information from the client device.

The disclosed systems and methods may further determine if a vulnerability exists on the software running on the computing device. In the above example, the systems and methods disclosed herein may compare the collected information about versions of software running on the computing device with a list of known vulnerable software versions. When a vulnerability is detected, the systems and methods described herein may then prevent any active advertising content using vulnerable software from running on the computing device by blocking the content. Additionally, the disclosed systems and methods may replace the active advertising content with non-active content or content that does not use the vulnerable software.

As detailed above, by preventing active advertising content from running on vulnerable software, the disclosed systems and methods may prevent malware from exploiting the vulnerable software through malvertising. In addition, by detecting potentially harmful advertising content before delivery of the content to an end user, the disclosed systems and methods may be able to seamlessly replace the content with different advertising content that does not pose a threat. Thus, the systems and methods described herein may provide more stringent controls over the delivery of online advertisements than traditional methods.

Figure 6:
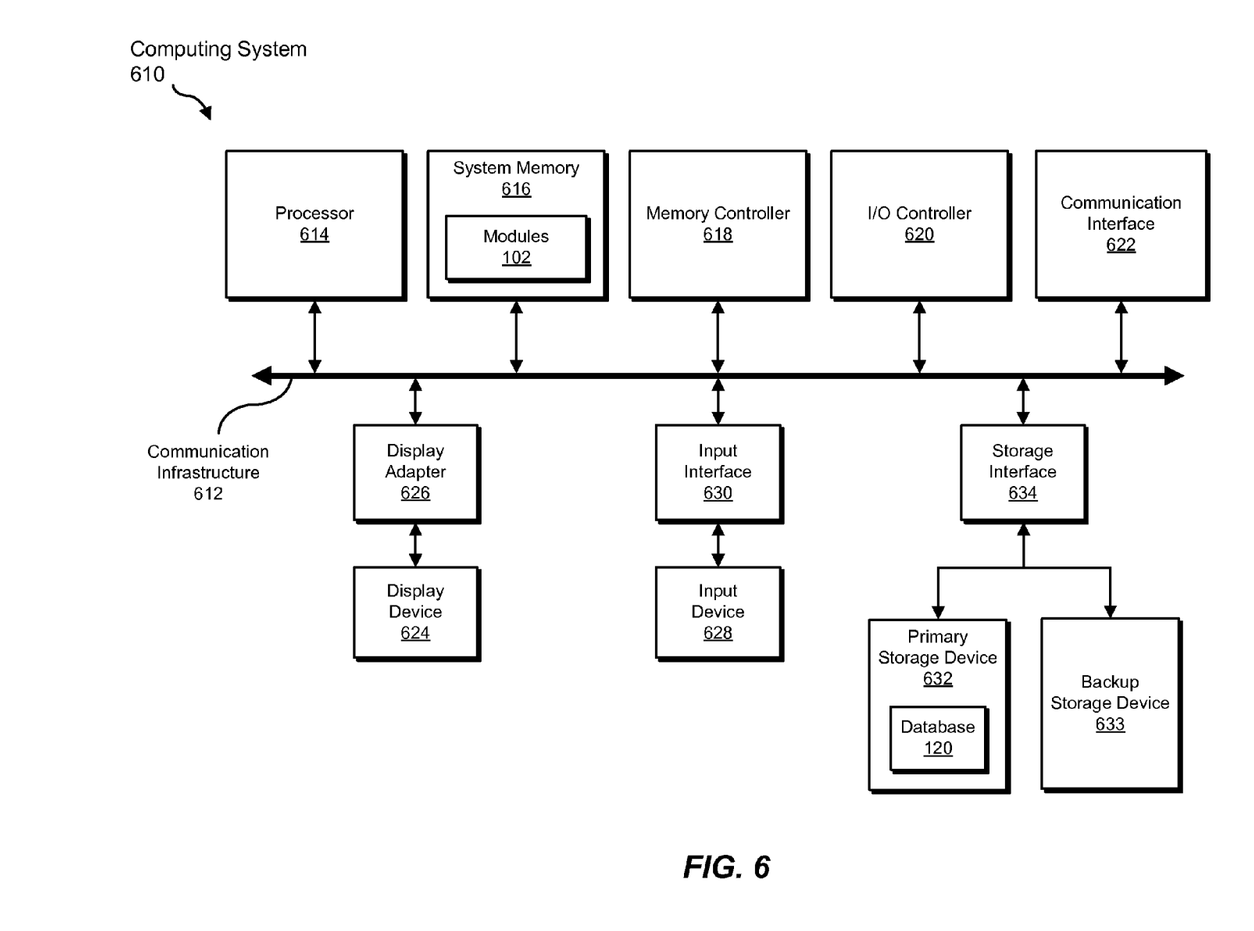
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
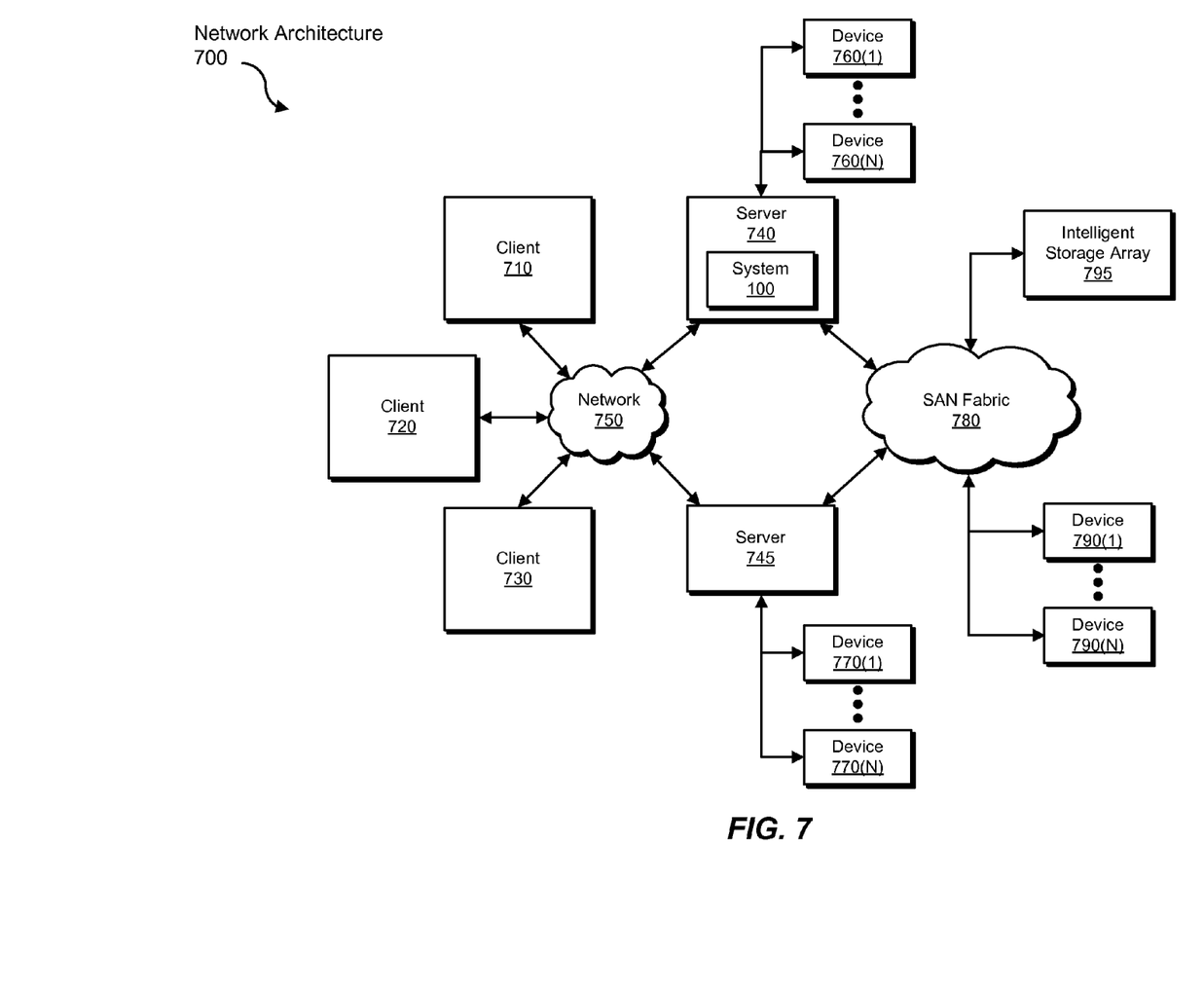
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for preventing the execution of online malvertising.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive software version information for a client device to be transformed, transform the software version information, output a result of the transformation to a storage or output device, use the result of the transformation to identify a vulnerability in the software of the client device, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing the execution of online malvertising, at least a portion of the method being performed by a computing device comprising at least one processor, the method comprising:
    maintaining a database of software version information for at least one client device;
    detecting a request from the client device to access a website that contains active advertising content;
    identifying, by querying the database of software version information, a vulnerability in at least one software element on the client device that may be used to deliver the active advertising content; and
    preventing delivery of the active advertising content to the client device by automatically replacing an advertisement running the active advertising content with a different advertisement during a real-time advertising bidding process.

2. The method of claim 1, wherein the software version information comprises at least one of:
    a software version identifier; and
    a user-selected optional feature.

3. The method of claim 1, wherein maintaining the database of software version information comprises:
    collecting the software version information from the client device; and
    updating the software version information for the client device.

4. The method of claim 3, wherein updating the software version information for the client device comprises at least one of:
    automatically collecting new software version information on a preset schedule; and
    collecting the new software version information based on receiving a notice of change from the client device.

5. The method of claim 1, wherein identifying the vulnerability in the software element on the client device comprises matching the software version information for the client device with a predetermined list of vulnerable software versions.

6. The method of claim 1, wherein preventing the delivery of the active advertising content to the client device comprises
    blocking the advertisement running the active advertising content.

7. The method of claim 6, wherein the different advertisement comprises at least one of:
    an advertisement with non-active content; and
    an advertisement with different active advertising content that does not use the vulnerable software element.

8. The method of claim 1, further comprising determining that a non-vulnerable version of the vulnerable software element exists.

9. The method of claim 8, further comprising prompting a user of the client device to update the vulnerable software element to the non-vulnerable version of the software element.

10. A system for preventing the execution of online malvertising, the system comprising:
    a maintenance module, stored in memory, that maintains a database of software version information for at least one client device;
    a detection module, stored in memory, that detects a request from the client device to access a website that contains active advertising content;
    an identification module, stored in memory, that identifies, by querying the database of software version information, a vulnerability in at least one software element on the client device that may be used to deliver the active advertising content;
    a prevention module, stored in memory, that prevents delivery of the active advertising content to the client device by automatically replacing an advertisement running the active advertising content with a different advertisement during a real-time bidding process; and
    at least one processor that executes the maintenance module, the detection module, the identification module, and the prevention module.

11. The system of claim 10, wherein the software version information comprises at least one of:
    a software version identifier; and
    a user-selected optional feature.

12. The system of claim 10, wherein the maintenance module maintains the database of software version information by:
    collecting the software version information from the client device; and
    updating the software version information for the client device.

13. The system of claim 12, wherein updating the software version information for the client device comprises at least one of:
    automatically collecting new software version information on a preset schedule; and collecting the new software version information based on receiving a notice of change from the client device.

14. The system of claim 10, wherein the identification module identifies the vulnerability in the software element on the client device by matching the software version information for the client device with a predetermined list of vulnerable software versions.

15. The system of claim 10, wherein the prevention module prevents the delivery of the active advertising content to the client device by
blocking the advertisement running the active advertising content.

16. The system of claim 15, wherein the different advertisement comprises at least one of:
an advertisement with non-active content; and
an advertisement with different active advertising content that does not use the vulnerable software element.

17. The system of claim 10, further comprising determining that a non-vulnerable version of the vulnerable software element exists.

18. The system of claim 17, further comprising prompting a user of the client device to update the vulnerable software element to the non-vulnerable version of the software element.

19. A non-transitory computer-readable medium comprising one or more computer-executable instructions that, when executed by at least one processor of a computing device, cause the computing device to:
maintain a database of software version information for at least one client device;
detect a request from the client device to access a website that contains active advertising content;
identify, by querying the database of software version information, a vulnerability in at least one software element on the client device that may be used to deliver the active advertising content; and
prevent delivery of the active advertising content to the client device by automatically replacing an advertisement running the active advertising content with a different advertisement during a real-time bidding process.

20. The non-transitory computer-readable medium of claim 19, wherein the software version information comprises at least one of:
a software version identifier; and
a user-selected optional feature.

* * * * *